United States Patent
Gaddam et al.

(10) Patent No.: US 12,545,676 B2
(45) Date of Patent: Feb. 10, 2026

(54) CRYSTALLINE FORM OF HYDROCHLORIDE SALT OF QUINOLINE DERIVATIVE

(71) Applicant: vTv Therapeutics LLC, High Point, NC (US)

(72) Inventors: Bapu Gaddam, Ellicott City, MD (US); Samuel Victory, Winston-Salem, NC (US); Dharma Rao Polisetti, High Point, NC (US)

(73) Assignee: VTV THERAPEUTICS LLC, High Point, NC (US)

( * ) Notice: Subject to any disclaimer, the term of this patent is extended or adjusted under 35 U.S.C. 154(b) by 462 days.

(21) Appl. No.: 18/005,159

(22) PCT Filed: Jul. 26, 2021

(86) PCT No.: PCT/US2021/043111
§ 371 (c)(1),
(2) Date: Jan. 11, 2023

(87) PCT Pub. No.: WO2022/026350
PCT Pub. Date: Feb. 3, 2022

(65) Prior Publication Data
US 2023/0312559 A1   Oct. 5, 2023

Related U.S. Application Data

(60) Provisional application No. 63/066,988, filed on Aug. 18, 2020, provisional application No. 63/057,408, filed on Jul. 28, 2020.

(51) Int. Cl.
C07D 471/04 (2006.01)

(52) U.S. Cl.
CPC ........ C07D 471/04 (2013.01); C07B 2200/13 (2013.01)

(58) Field of Classification Search
None
See application file for complete search history.

(56) References Cited

U.S. PATENT DOCUMENTS

| | | | |
|---|---|---|---|
| 4,927,820 | A | 5/1990 | Shutske et al. |
| 5,834,485 | A | 11/1998 | Dyke et al. |
| 7,964,608 | B2 | 6/2011 | Mjalli et al. |
| 8,329,715 | B2 | 12/2012 | Mjalli et al. |
| 8,853,226 | B2 | 10/2014 | Mjalli et al. |
| 9,163,022 | B2 | 10/2015 | Mjalli et al. |
| 9,393,245 | B2 | 7/2016 | Mjalli et al. |
| 9,687,489 | B2 | 6/2017 | Mjalli et al. |
| 9,833,457 | B2 | 12/2017 | Mjalli et al. |
| 10,085,990 | B2 | 10/2018 | Mjalli et al. |
| 10,391,097 | B2 | 8/2019 | Mjalli et al. |
| 10,568,888 | B2 | 2/2020 | Mjalli et al. |
| 2003/0105129 | A1 | 6/2003 | Mortlock et al. |
| 2004/0171593 | A1 | 9/2004 | Keating et al. |
| 2005/0065116 | A1 | 3/2005 | Carson et al. |
| 2008/0255209 | A1 | 10/2008 | Klein et al. |
| 2009/0018333 | A1 | 1/2009 | Grauert et al. |
| 2010/0190808 | A1 | 7/2010 | Mjalli et al. |
| 2011/0160234 | A1 | 6/2011 | Mjalli et al. |
| 2012/0028932 | A1 | 2/2012 | Nickolaus et al. |
| 2012/0035143 | A1 | 2/2012 | Nickolaus et al. |
| 2018/0360839 | A1 | 12/2018 | Mjalli et al. |
| 2023/0265089 | A1 | 8/2023 | Gaddam |

FOREIGN PATENT DOCUMENTS

| | | |
|---|---|---|
| EP | 0143001 A2 | 5/1985 |
| PL | 193012 B1 | 1/2007 |
| WO | WO-9857936 A1 | 12/1998 |
| WO | WO-03024489 A2 | 3/2003 |
| WO | WO-03062238 A1 | 7/2003 |
| WO | WO-2007004958 A1 | 1/2007 |
| WO | WO-2009094528 A1 | 7/2009 |
| WO | WO-2009125809 A1 | 10/2009 |
| WO | WO-2011124524 A1 | 10/2011 |
| WO | WO-2011124525 A1 | 10/2011 |
| WO | WO-2022005494 A1 | 1/2022 |
| WO | WO-2022026350 A1 | 2/2022 |

OTHER PUBLICATIONS

Berge et al. Pharmaceutical Salts. Journal of Pharmaceutical Sciences 66(1):1-19 (Jan. 1977).
Chemical Abstracts Registry Entry 375362-97-3, entered Dec. 14, 2001.
Geis et al. Tricyclic theophylline derivatives with high water-solubility: structure-activity relationships at adenosine receptors, phosphodiesterases, and benzodiazepine binding sites. Pharmazie 50(5):333-336 (1995).
Haede et al., Herstellung Kondensierter 2-Alkylthio-4-hydroxypyrimidine J. Heterocyclic Chem. 18(7):1417-1419 (1981).
Haider et al., Product Class 9: Cinnolines in Science of Synthesis. ChemInform 16:251-313 (2004).
Katritzky et al., Polycyclic Heteroaromatics from Reactions of Acylbenzotriazoles with Aryl Isocyanates, J. Org. Chem., 65:8069-8073 (2000).
Landells et al. A biochemical and functional assessment of monocyte phosphodiesterase activity in healthy and asthmatic subjects. Pulm Pharmacol Ther 13(5):231-239 (2000).
Lewgowd et al., Determination of Lipophilicity, pKa Measurement and Action on the Central Nervous System of Some Pyrimido[5,4-c]quinolines Acta Poloniae Pharm., 62(4):271-281 (2005).
Lewgowd et al., Synthesis and cytotoxicity of new potential intercalators based on tricyclic systems of some pyrimido[5,4-c]cinnoline and pyrimido[5,4-c]quinoline derivatives. Part I Acta Poloniae Pharm., 62(2):105-110 (2005).
Menon et al., Synthesis and Antimicrobial Properties of Pyrimido[5,4-c]cinolin-2,4(1H,3H)-diones J. Indian Chem. Soc., 72(10):731-733 (1995).

(Continued)

Primary Examiner — Brian J Davis
(74) Attorney, Agent, or Firm — WILSON SONSINI GOODRICH & ROSATI

(57) ABSTRACT

The present disclosure relates to a crystalline form of trans-4-[1-(3-Chloro-phenyl)-7-methoxy-2,4-dioxo-3,4-dihydro-2H-pyrimido[5,4-c]quinolin-3-yl]-cyclohexanecarboxylic acid hydrochloride, methods of preparation, and its use as a therapeutic agent to treat inflammatory diseases.

14 Claims, 5 Drawing Sheets

(56) References Cited

OTHER PUBLICATIONS

Nargund et al. Synthesis and antimicrobial and anti-inflammatory activities of substituted 2-mercapto-3-(N-aryl)pyrimido[5,4-c]cinnolin-4-(3H)-ones. J Pharm Sci 81(4):365-366 (1992).
PCT/US2009/031819 International Search Report and Written Opinion dated Mar. 25, 2009.
PCT/US2020/044410 International Search Report and Written Opinion dated Mar. 25, 2021.
PCT/US2021/043111 International Search Report and Written Opinion dated Nov. 5, 2021.
Peter et al. Inhibition of cyclooxygenase-2 prevents adverse effects induced by phosphodiesterase type 4 inhibitors in rats. Br J Pharmacol 162(2):415-427 (2011).
PubChem CID 5213595, create date, Oct. 7, 2005.
Reimund et al. Anti-TNF-alpha properties of new 9-benzyladenine derivatives with selective phosphodiesterase-4-inhibiting properties. Biochem Biophys Res Commun 288(2):427-434 (2001).
Shindo et al., Synthesis of Heterocyclic Compounds Isosterically Related to Pyrazolo[4,3-c]quinolines as Benzodiazepine Receptor Ligands. Heterocycles 29(5):899-912 (1989).
Spina. PDE4 inhibitors: current status. Br J Pharmacol 155:308-315 (2008).
Stanczak et al., Comparison of pharmacophore cinnoline and quinoline systems on the basis of computer calculation and pharmacological screening of their condensed systems. Pharmazie 56(6):501-505 (2001).
Stanczak et al., Determination of the Lipophilicity of Pyrimido[5,4-c]quinoline Derivatives by Reversed-Phase Thin-Layer Chromatography. Part 1. Lipophilicity of Pyrimido[5,4-c]quinolin-4(3H)-ones and 1,2,3,4-Tetrahydropyrimido[5,4-c]quinolin-2,4-diones. J. Planar Chromatography—Modern TLC 15(3):169-176 (2002).
Stanczak et al., Synthesis and biological activity of some 4-amino-3-cinnoline carboxylic acid derivatives. Pharmazie 53(3):156-161 (1998).
Sturton et al. Phosphodiesterase 4 inhibitors for the treatment of COPD. Chest 121(5 Suppl):192S-196S (2002).
Zahran et al. Synthesis of some pyrimidines and their benzo-derivatives via 6 pi-electron cyclization reactions. Afinidad 52(460:415-418 (1995).
Byrn et al. Pharmaceutical Solids: A Strategic Approach to Regulatory Considerations. Pharmaceutical Research 12(7):945-954 (1995).

CRYSTALLINE FORM OF HYDROCHLORIDE SALT OF QUINOLINE DERIVATIVE

FIELD OF DISCLOSURE

The present disclosure relates to a crystalline form of trans-4-[1-(3-Chloro-phenyl)-7-methoxy-2,4-dioxo-3,4-dihydro-2H-pyrimido[5,4-c]quinolin-3-yl]-cyclohexanecarboxylic acid hydrochloride, methods of preparation, and its use as a therapeutic agent.

BACKGROUND OF DISCLOSURE

Tumor necrosis factor-alpha (TNF-α), also referred to as TNF, DIF, TNF-alpha, TNFA, and TNFSF2, is a cell-associated cytokine that is processed from a 26 kd precursor form to a 17 kd soluble form. TNF-α has been shown to be a primary mediator in humans and in animals of inflammation, fever, and acute phase responses, similar to those observed during acute infection and shock. Excess TNF-α has been shown to be lethal. There is now considerable evidence that blocking the effects of TNF-α by use of soluble TNF receptor or with specific neutralizing antibodies can be beneficial in a variety of circumstances including autoimmune diseases such as rheumatoid arthritis (RA), non-insulin dependent diabetes mellitus (NIDDM or Type II diabetes), and Crohn's disease.

Phosphodiesterases (PDEs) comprise a superfamily of enzymes responsible for the hydrolysis and inactivation of the secondary messengers cyclic adenosine monophosphate (cAMP) and cyclic guanosine monophosphate (cGMP). Different PDE families have been identified (PDE1, PDE2, PDE3, PDE4, etc.) which differ in substrate preference, catalytic activity, sensitivity to endogenous activators and inhibitors, and encoding genes.

The PDE4 isoenzyme family exhibits a high affinity for cyclic AMP but has weak affinity for cyclic GMP. Increased cyclic AMP levels caused by PDE4 inhibition are associated with the suppression of cell activation in a wide range of inflammatory and immune cells, including lymphocytes, macrophages, basophils, neutrophils, and eosinophils. Moreover, PDE4 inhibition decreases the release of the cytokine TNF-α.

In view of these physiological effects, PDE4 inhibitors of varied chemical structures have been disclosed for the treatment of chronic and acute inflammatory diseases and of other pathological conditions, diseases and disorders known to be susceptible to amelioration by inhibition of PDE4.

PDE4 inhibitors are thought to be useful in the treatment and/or prophylaxis of a variety of diseases/conditions, especially inflammatory and/or allergic diseases, in mammals such as humans, for example: asthma, chronic obstructive pulmonary disease (COPD) (e.g. chronic bronchitis and/or emphysema), atopic dermatitis, urticaria, allergic rhinitis, allergic conjunctivitis, vernal conjunctivitis, eosinophilic granuloma, psoriasis, rheumatoid arthritis, septic shock, ulcerative colitis, Crohn's disease, reperfusion injury of the myocardium and brain, chronic glomerulonephritis, endotoxic shock, adult respiratory distress syndrome, multiple sclerosis, cognitive impairment (e.g. in a neurological disorder such as Alzheimer's disease), depression, or pain. Ulcerative colitis and/or Crohn's disease are collectively often referred to as inflammatory bowel disease.

Further, compounds which inhibit the production of TNF-α are believed useful in a wide variety of diseases and disorders through mechanism based therapeutic intervention. TNF-α inhibitors are believed useful for diseases including but not limited to viral, alcoholic, or drug-induced acute and fulminant hepatitis, hepatic steatosis, both alcoholic and non-alcoholic, viral and non-viral hepatitis, hepatic cirrhosis, autoimmune hepatitis, chronic active hepatitis, Wilson's disease, myasthenia gravis, idiopathic sprue, autoimmune inflammatory bowel disease, ulcerative colitis, Crohn's disease, inflammatory bowel diseases, endocrine ophthalmopathy, Grave's disease, sarcoidosis, primary biliary cirrhosis, pancreatitis, nephritis, endotoxin shock, septic shock, hemodynamic shock, sepsis syndrome, post ischemic reperfusion injury, malaria, mycobacterial infection, meningitis, psoriasis, asthma, chronic obstructive pulmonary disease (COPD), eosinophilia, congestive heart failure, fibrotic diseases, cystic fibrosis, pulmonary fibrosis, hepatic fibrosis, renal fibrosis, cachexia, graft rejection, rejection by transplantation, cancer, diseases involving angiogenesis, autoimmune diseases, ankylosing spondylitis, autoimmune encephalomyelitis, autoimmune hematological disorders, hemolytic anemia, aplastic anemia, pure red cell anemia, idiopathic thrombocytopenia, systemic lupus erythematosus (SLE), polychondritis, scleroderma, Wegener granulomatosis, dermatomyositis, Reiter's syndrome, non-infection uveitis, autoimmune keratitis, keratoconjunctivitis sicca, vernal keratoconjunctivitis, interstitial lung fibrosis, psoriatic arthritis, psoriasis and other benign or malignant proliferative skin diseases, atopic dermatitis, urticaria, neurodegenerative disorders, Parkinson's disease, Alzheimer's disease, acute and chronic multiple sclerosis, cancer, viral infection such as SARS, MERS, COVID-19, or human immunodeficiency virus (HIV), cachexia, thrombosis, skin inflammatory diseases, osteoarthritis (OA), osteoporosis, RA, emphysema, chronic bronchiolitis, allergic rhinitis, radiation damage, hyperoxic alveolar injury, periodontal disease, non-insulin dependent diabetes mellitus (Type II diabetes), and insulin dependent diabetes mellitus (Juvenile or Type I diabetes).

PDE4 inhibitors may be a valuable therapeutic option to treat respiratory viral infections such as SARS, MERS, or COVID-19 treatment due to their unique mechanism of action, resulting to the upstream inhibition of multiple cytokine signaling pathways along with the regulation of the pro-inflammatory/anti-inflammatory balance. Furthermore, PDE4 inhibitors may specifically ameliorate airway and lung inflammation, and protect patients from associated acute lung injury and severe respiratory failure leading to intubation and high mortality.

Thus, there is continued need to identify and develop new compounds that inhibit PDE4 enzyme activity and/or production of TNF-alpha.

SUMMARY OF INVENTION

As used herein, COMPOUND I refers to

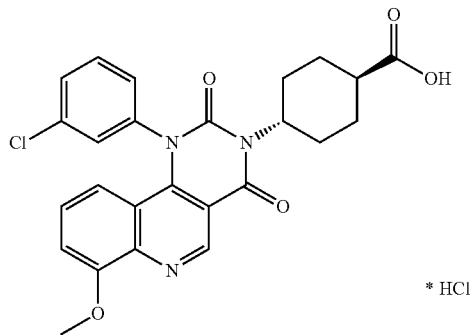 [SMILES: COc1cccc2c1ncc1c(=O)n([C@H]3CC[C@H](C(=O)O)CC3)c(=O)n(-c3cccc(Cl)c3)c12]

which may be identified as trans-4-[1-(3-Chloro-phenyl)-7-methoxy-2,4-dioxo-3,4-dihydro-2H-pyrimido[5,4-c]quinolin-3-yl]-cyclohexanecarboxylic acid hydrochloride salt.

Crystalline forms of COMPOUND I, its preparation, pharmaceutical compositions comprising crystalline forms of COMPOUND I, and their use as an inhibitor of PDE4 activity and in the treatment of various medical conditions are described herein. In some aspects, the present disclosure provides a polymorphic form of COMPOUND I ("Form I").

These and other embodiments of the present invention are described in greater detail in the detailed description which follows.

DETAILED DESCRIPTION

Definitions

Figure 1:
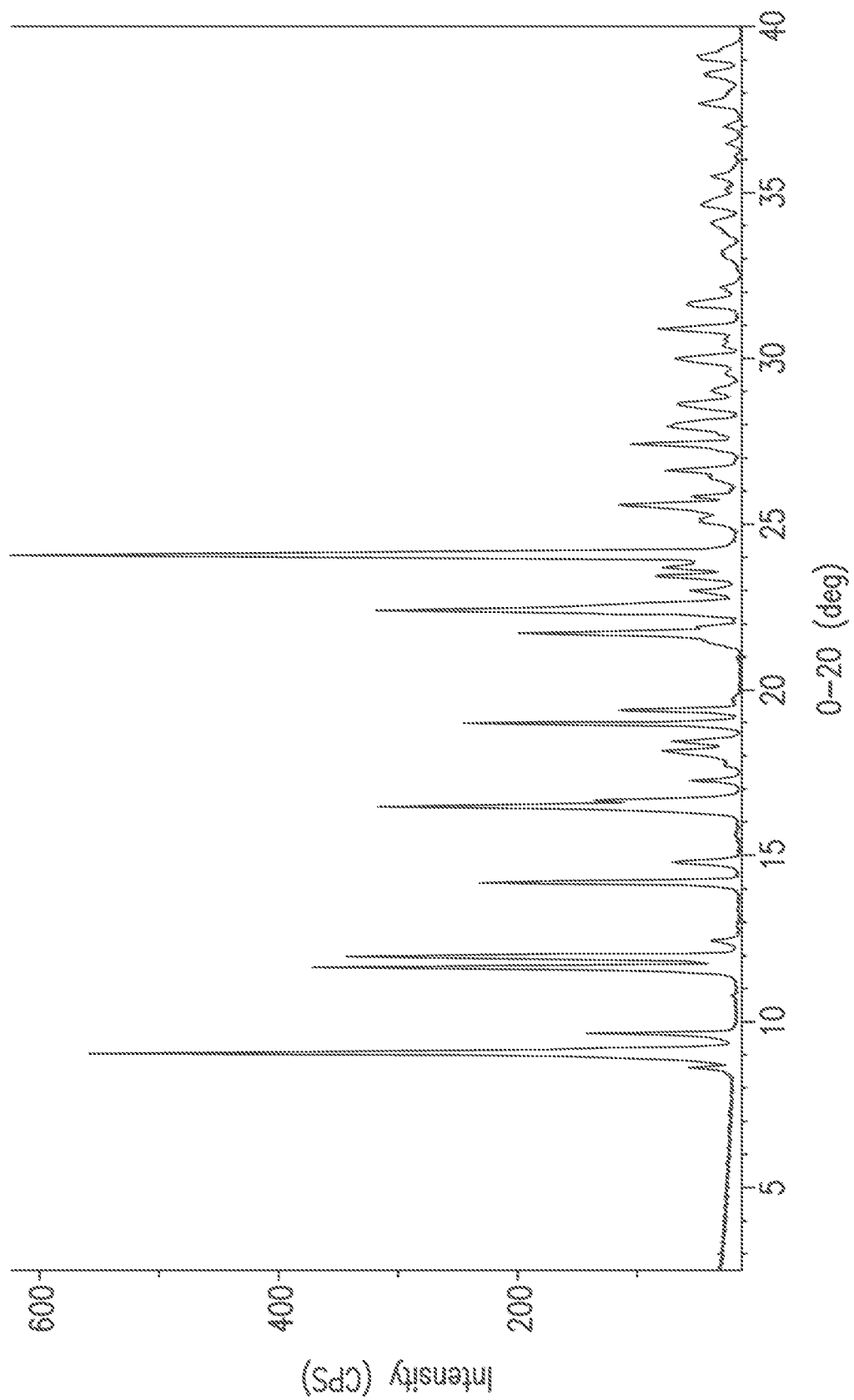
FIG. 1 is an X-ray Powder Diffraction ("XRPD") Pattern of Form I.

Unless otherwise stated, structures depicted herein are also meant to include compounds which differ only in the presence of one or more isotopically enriched atoms. For example, compounds having the present structure except for the replacement of a hydrogen atom by a deuterium or tritium, or the replacement of a carbon atom by a $^{13}$C- or $^{14}$C-enriched carbon are within the scope of the invention.

The term "therapeutically effective amount" is used herein to denote the amount of COMPOUND I that will elicit the therapeutic response of a subject that is being sought. In an embodiment, the therapeutic response may be inhibiting PDE4 enzyme activity and/or inhibiting production of TNF-α in individual cells, tissues, organs of a subject. In an embodiment, a therapeutically effective amount may be achieved in a subject by administering a dosage of less than 1 gram or of less than 100 mg of compound per day. In another embodiment, the dosage level of administration is greater than 1 mg of compound per day. In an embodiment, the dosage of COMPOUND I administered is between 1 and 100 mg, or between 1 and 50 mg, or between 10 and 50 mg, or between 30 and 50 mg. In other embodiments, the dosage of COMPOUND I administered is between 1 and 20 mg, or between 5 and 15 mg, or between 10 and 20 mg, or between 20 and 30 mg.

The term "treatment" as used herein, refers to the full spectrum of treatments for a given condition or disorder from which a subject is suffering, including alleviation or amelioration of one or more of the symptoms resulting from that disorder, to the delaying of the onset or progression of the disorder.

The term "subject" may refer any mammal such as, but not limited to, humans. In one embodiment, the subject is a human. In another embodiment, the subject is a human who exhibits one or more symptoms characteristic of the condition to be treated. The term "subject" does not require one to have any particular status with respect to any hospital, clinic, or research facility (e.g., as an admitted patient, a study participant, or the like). In an embodiment, the subject may be "a subject in need thereof."

A "pharmaceutically acceptable carrier" is a medium generally accepted in the art for the delivery of biologically active agents to mammals, e.g., humans. Such carriers are generally formulated according to a number of factors well within the purview of those of ordinary skill in the art to determine and account for. These include, without limitation, the type and nature of the active agent being formulated; the subject to which the agent-containing composition is to be administered; the intended route of administration of the composition; and the therapeutic indication being targeted. Pharmaceutically acceptable carriers include both aqueous and non-aqueous liquid media, as well as a variety of solid and semi-solid dosage forms. Such carriers can include a number of different ingredients and additives in addition to the active agent, such additional ingredients being included in the formulation for a variety of reasons, e.g., stabilization of the active agent, well known to those of ordinary skill in the art. Descriptions of suitable pharmaceutically acceptable carriers, and factors involved in their selection, are found in a variety of readily available sources, e.g., Remington's Pharmaceutical Sciences, 17th ed., Mack Publishing Company, Easton, Pa. 1985, the contents of which are incorporated herein by reference.

The term "pharmaceutically acceptable salt" refers to a salt prepared from pharmaceutically acceptable inorganic and organic acids and bases. For example, COMPOUND I may react with a number of inorganic and organic acids to form a pharmaceutically acceptable acid addition salt such as, but not limited to, hydrochloric, hydrobromic, hydroiodic, sulfuric, phosphoric, formic, acetic, propionic, citric, tartaric, and benzoic acids. Pharmaceutically acceptable base addition salts can be prepared from inorganic and organic bases. Salts derived from inorganic bases, include by way of example, sodium, potassium, lithium, ammonium, calcium and magnesium salts. Salts derived from organic bases include, but are not limited to, salts of primary, secondary and tertiary amines. Specific examples of such amines include, by way of example, isopropylamine, trimethylamine, diethylamine, tri (iso-propyl)amine, tri (n-propyl)amine, ethanolamine, 2-dimethylaminoethanol, tromethamine, lysine, arginine, histidine, caffeine, procaine, choline, betaine, and ethylenediamine. Such pharmaceutically acceptable salts and common methodology for preparing them are well known in the art. See, for example, P. Stahl, et al., HANDBOOK OF PHARMACEUTICAL SALTS: PROPERTIES, SELECTION AND USE, (VCHA/Wiley-VCH, 2002); S. M. Berge, et al., "Pharmaceutical Salts", Journal of Pharmaceutical Sciences, Vol. 66, No. 1, January 1977.

Crystalline Form of COMPOUND I

Embodiment 1 (E1): The present invention provides a crystalline form of trans-4-[1-(3-Chloro-phenyl)-7-methoxy-2,4-dioxo-3,4-dihydro-2H-pyrimido[5,4-c]quinolin-3-yl]-cyclohexanecarboxylic acid hydrochloride.

E2: The crystalline form of E1, characterized by an XRPD pattern having peaks at 2θ angles of 11.6°±0.2°, 12.0°±0.2°, and 24.1°±0.2°, measured using Cu Kα X-rays.

E3: The crystalline form of E1 or E2, characterized by an XRPD pattern having peaks at 2θ angles of 11.6°±0.2°, 12.0°±0.2°, 14.2°±0.2°, and 24.1°±0.2°, measured using Cu Kα X-rays.

E4: The crystalline form of any one of E1 to E3, characterized by an XRPD pattern substantially as shown in FIG. 1 or by the peaks listed in Table 1.

E5: The crystalline form of any one of E1 to E4, which is characterized by a first endothermic peak with an onset at about 231° C. and a second endothermic peak with an onset at about 354° C., or is characterized by a first endothermic peak with a peak at about 263° C. and a second endothermic peak with a peak at about 360° C., as determined by DSC.

Figure 2:
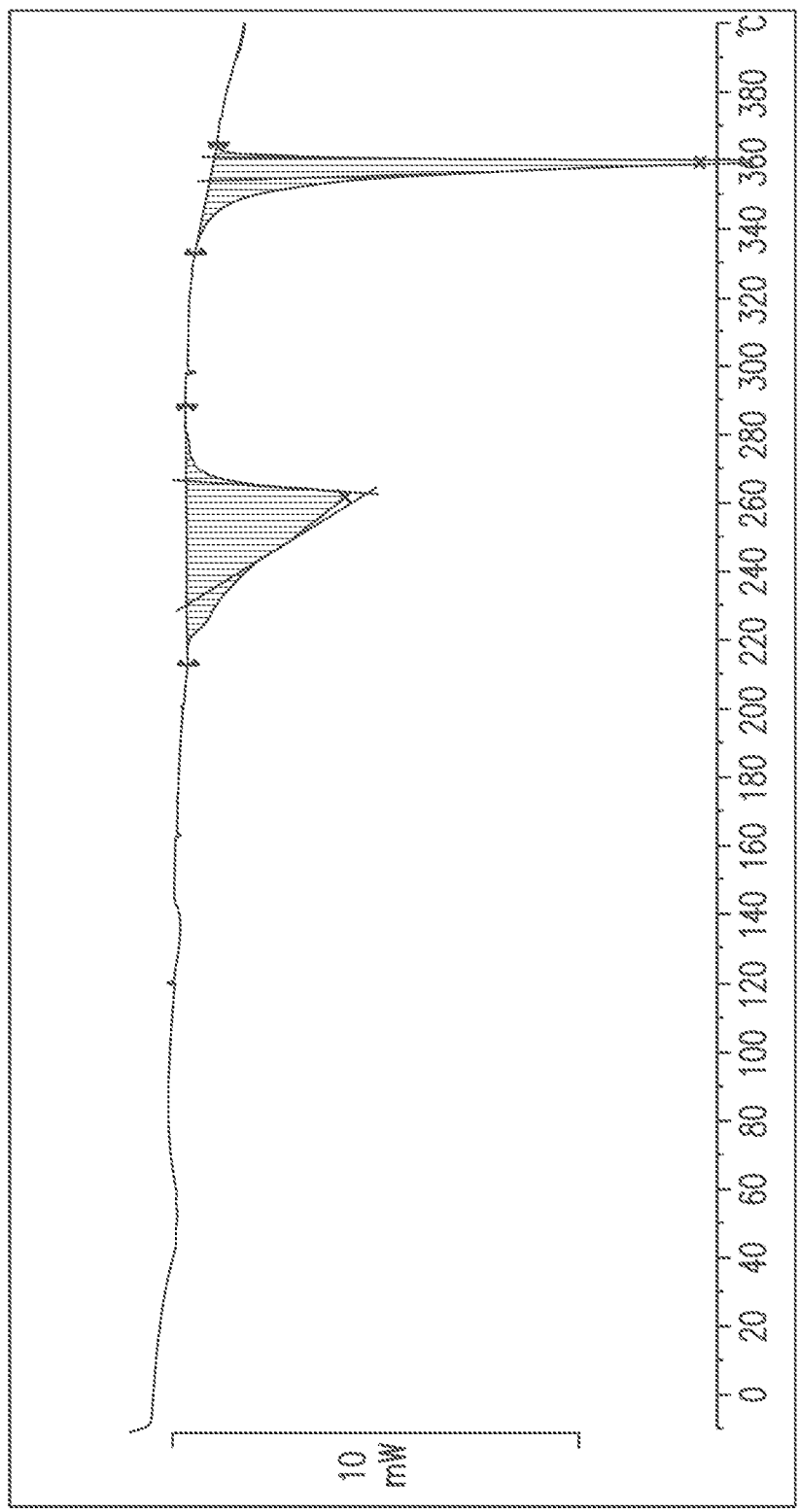
FIG. 2 is a Differential Scanning calorimetry ("DSC") profile of Form I.

E6: The crystalline form of any one of E1 to E5, characterized by a DSC profile substantially as shown in FIG. 2.

E7: The crystalline form of any one of E1 to E6, characterized by a weight loss of about 0.8% wt/wt from about 25° C. to about 127° C., a weight loss of about 6.9% wt/wt from about 130° C. to about 300° C., a weight loss of about 1.7% wt/wt from about 300° C. to about 350° C., and/or a weight loss of about 9.5% from about 25° C. to about 350° C. as determined by TGA.

Figure 3:
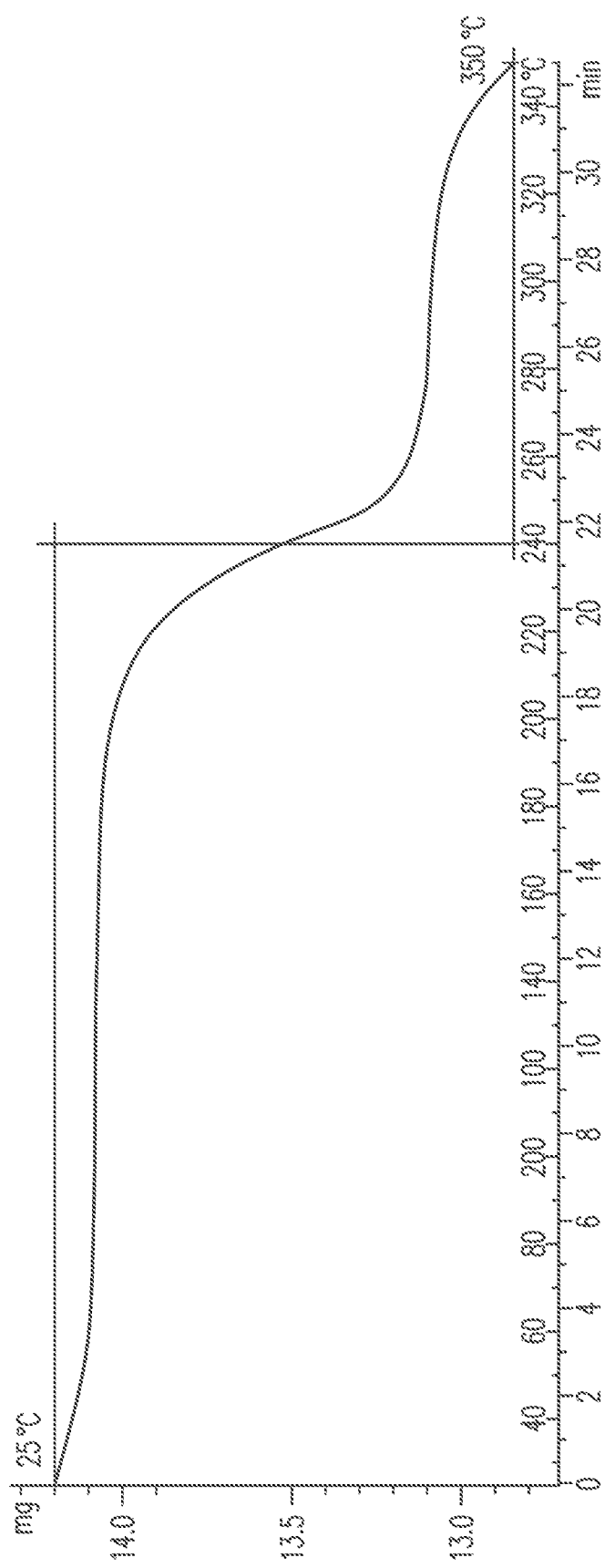
FIG. 3 is a Thermogravimetric Analysis ("TGA") of Form I.

E8. The crystalline form of any one of E1 to E7, characterized by a TGA profile substantially as shown in FIG. 3.

E9. The crystalline form of any one of E1 to E8, characterized by a solid-state $^{13}$C NMR spectrum having a peak at one of 177.4, 161.9, 149.4, or 130.7 ppm, when the external reference of the carbonyl resonance of glycine is 176.5 ppm.

E10. The crystalline form of any one of E1 to E9, characterized by a solid-state $^{13}$C NMR spectrum having peaks at 177.4, 161.9, 149.4, and 130.7 ppm, when the external reference of the carbonyl resonance of glycine is 176.5 ppm.

E11. The crystalline form of any one of E1 to E10, characterized by a solid-state $^{13}$C NMR spectrum having peaks at 177.4, 161.9, 149.4, 139.3, 130.7, 118.0, 117.4, and 108.6 ppm, when the external reference of the carbonyl resonance of glycine is 176.5 ppm.

Figure 4:
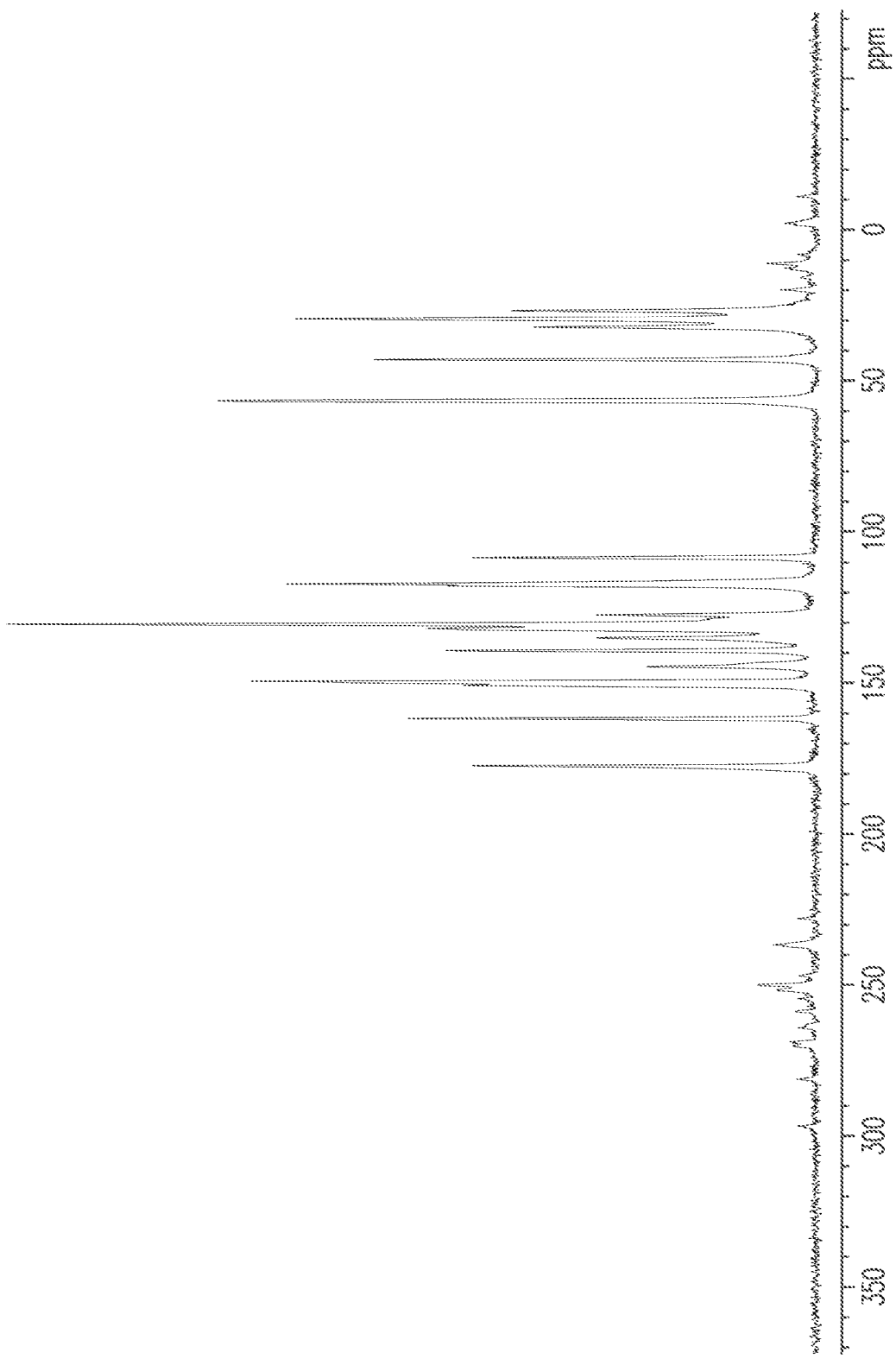
FIG. 4 is a solid-state $^{13}$C NMR spectrum of Form I.

E12. The crystalline form of any one of E1 to E11, characterized by a solid-state $^{13}$C NMR spectrum substantially as shown in FIG. 4.

E13. The crystalline form of any one of E1 to E12, characterized by FT-IR peaks at 1679 and 1731 cm-1.

E14. The crystalline form of any one of E1 to E13, characterized by FT-IR peaks at 768, 1447, 1626, 1679, 1731, and 1742 cm-1.

Figure 5:
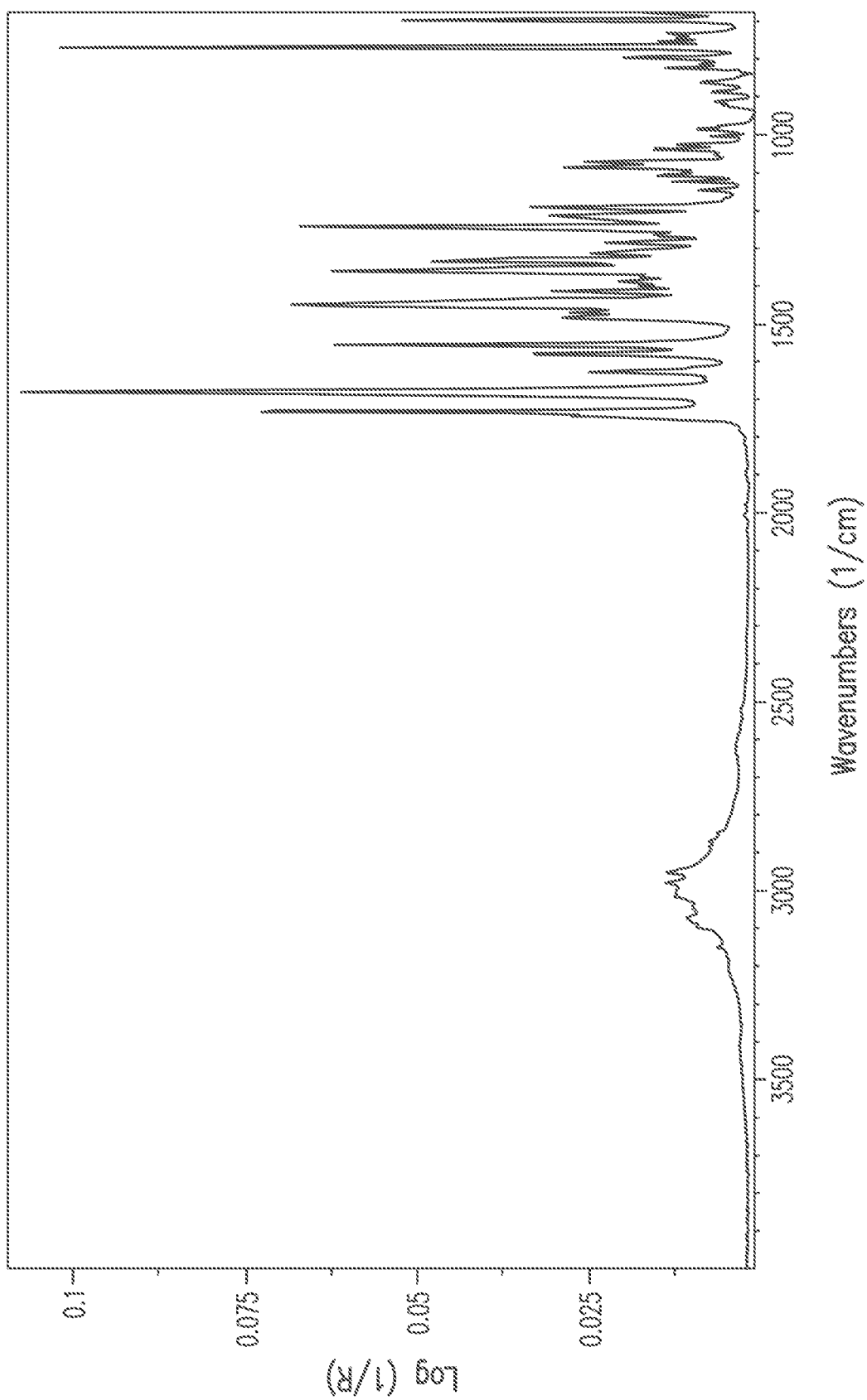
FIG. 5 is a Fourier Transformed Infrared Red ("FT-IR") spectrum of Form I.

E15. The crystalline form of any one of E1 to E14, characterized by FT-IR peaks substantially as shown in FIG. 5.

E16. The crystalline form of any one of E1 to E15, characterized by at least two or at least three of the following features (a)-(e):
  a) an XRPD pattern having peaks at 2θ angles of 11.6°=0.2°, 12.0°=0.2° and 24.1°=0.2°, measured using Cu Kα X-rays;
  b) a DSC profile substantially as shown in FIG. 2;
  c) a TGA profile substantially as shown in FIG. 3;
  d) a solid-state $^{13}$C NMR spectrum having peaks at 177.4, 161.9, 149.4, and 130.7 ppm, when the external reference of the carbonyl resonance of glycine is 176.5 ppm;
  e) FT-IR peaks at 1679 and 1731 cm·1.

E17. The crystalline form of any one of E1 to E16, characterized by a unit cell that indexes as primitive monoclinic.

E18. The crystalline form of any one of E1 to E17, characterized by a unit cell with an a value of about 11.950 Å, a b value of about 11.288 Å, and a c value of about 18.340 Å.

E19. The crystalline form of any one of E1 to E18, characterized by a unit cell with a volume of about 2470.3 Å3.

E20. The crystalline form of any one of E1 to E19, characterized by a particle size distribution with a D10 value of about 10 µm to about 25 µm, a D50 value of about 35 µm to about 50 µm, and/or a D90 value of about 85 µm to about 100 µm.

E21. The crystalline form of any one of E1 to E20, wherein the crystalline form is substantially free of other polymorphic forms.

E22. The crystalline form of any one of E1 to E21, wherein the crystalline form has a polymorphic purity of at least about 80%, or at least about 90%, or at least about 95%, or at least about 99%.

Method of Producing Crystal Form I

In another aspect, the present invention provides a method for producing the crystalline form of any one of Embodiments 1 to 22 comprising:
  a) mixing trans-4-[1-(3-Chloro-phenyl)-7-methoxy-2,4-dioxo-3,4-dihydro-2H-pyrimido[5,4-c]quinolin-3-yl]-cyclohexanecarboxylic acid or salt thereof in an aqueous solution comprising hydrochloric acid, where the aqueous solution is at least 30° C.;
  b) cooling to mixture to below 30° C.

The aqueous solution comprising hydrochloric acid may comprise 6 M HCl or be a 6M HCl solution. The steps a) and b) may be repeated one, two, three, or more times before collecting or filtering the solids from the solution. The aqueous solution in step a) may be at least 50° C., or at least 55° C., or at least 60° C. The mixing in step a) may last at least 10 min, 15 min, 30 min, or over 60 minutes, before cooling the mixture. The mixture in step b) may be cooled to below 25° C., or below 20° C. for at least 5 min, 10 min, or 15 min, before either repeating step a) or collecting or filtering the solids from the solution. In step a), the a pharmaceutically acceptable salt of trans-4-[1-(3-Chloro-phenyl)-7-methoxy-2,4-dioxo-3,4-dihydro-2H-pyrimido[5,4-c]quinolin-3-yl]-cyclohexanecarboxylic acid may be used as the starting material. The pharmaceutically acceptable salt may be a hydrochloric acid salt.

In another aspect, the present invention provides a method for producing the crystalline form of any one of Embodiments 1 to 22 comprising:
  a) hydrolyzing the ester group of trans-tert-butyl 4-[1-(3-chlorophenyl)-7-methoxy-2,4-dioxo-pyrimido[5,4-c]quinolin-3-yl]cyclohexanecarboxylate in an acidic solution to produce trans-4-[1-(3-chloro-phenyl)-7-methoxy-2,4-dioxo-3,4-dihydro-2H-pyrimido[5,4-c]quinolin-3-yl]-cyclohexanecarboxylic acid or salt thereof; and
  b) adding water to the acidic solution to form a precipitate.

In an embodiment, the acidic solution in step a) may comprise acetic acid and hydrochloric acid. In another embodiment, the acidic solution is a mixture of acetic acid and 6 M HCl. In another embodiment, the acidic solution in step a) may be maintain below 30° C. or between 20 to 30° C. during the hydrolysis. In the further embodiment, the method may comprise the additional step of c) separating the precipitate from the acidic solution. In the further embodiment, the method may comprise the additional step of d) washing the precipitate a solution of hydrochloric acid, such as 5 M HCl or 6 M HCl. In the further embodiment, the method may comprise the additional step of e) slurring the precipitate in a solution of hydrochloric acid and heating the solution to at least 50° C., or at least 55° C., or at least 60° C. Step e) may last at least 5 min, 10 min, or 15 min, followed by cooling the slurry to below 30° C., or below 25° C. for at least 5 min, 10 min, or 15 min, before either repeating or collecting the precipitate from the solution.

Pharmaceutical Compositions

In another aspect, the present invention provides pharmaceutical compositions comprising a crystalline form of COMPOUND I and a pharmaceutically acceptable carrier. In an embodiment, the present invention provides a pharmaceutical composition comprising a crystalline form of COMPOUND I of any one of embodiments E1 to E22.

In another embodiment, the present invention provides pharmaceutical compositions of any of the previous embodiments, and further comprising one or more additional therapeutic agent(s). The one or more additional therapeutic agents are selected from steroids, cyclooxygenase inhibitors, non-steroidal-anti-inflammatory drugs, or TNF-α antibodies, such as for example acetyl salicylic acid, bufexamac, diclofenac potassium, sulindac, diclofenac sodium, ketorolac trometamol, tolmetin, ibuprofen, naproxen, naproxen sodium, tiaprofenic acid, flurbiprofen, mefenamic acid, nifluminic acid, meclofenamate, indomethacin, proglumetacine, ketoprofen, nabumetone, paracetamol, piroxicam, tenoxicam, nimesulide, fenylbutazon, tramadol, beclomethasone dipropionate, betamethasone, beclamethasone, budesonide, fluticasone, mometasone, dexamethasone, hydrocortisone, methylprednisolone, prednisolone, prednisone, triamcinolone, celecoxib, rofecoxib, infliximab, leflunomide, etanercept, methotrexate, sulfasalazine, antilymphocytory immunoglobulines, antithymocytory immunoglobulines, azathioprine, cyclosporine, tacrolimus substances, ascomycin, rapamycin, or muromonab-CD3.

The present invention further provides pharmaceutical compositions of any of the previous embodiments comprising a therapeutically effective amount of COMPOUND I.

In accordance with another aspect of the invention there is also provided a process for the preparation of a pharmaceutical composition comprising admixing a crystalline form of COMPOUND I with one or more pharmaceutically acceptable carriers.

Pharmaceutical compositions may be presented in unit dose forms containing a predetermined amount of active ingredient per unit dose. Such a unit may contain, as a non-limiting example, 0.5 mg to 1 g of COMPOUND I, depending on the condition being treated, the route of administration, and the age, weight, and condition of the patient. Typical unit dosage formulations are those containing a daily dose or sub-dose, as herein above recited, or an appropriate fraction thereof, of an active ingredient. Such pharmaceutical compositions may be prepared by any of the methods well known in the pharmacy art.

In an embodiment, an individual dose form of a pharmaceutical composition may comprise a crystalline form of COMPOUND I in an amount greater than 1 mg of COMPOUND I. In another embodiment, the pharmaceutical composition may comprise a crystalline form of COMPOUND I in an amount between 1 and 100 mg, or between 1 and 50 mg, or between 10 and 50 mg, or between 30 and 50 mg. In other embodiments, the pharmaceutical composition may comprise a crystalline form of COMPOUND I in an amount between 1 and 20 mg, or between 5 and 15 mg, or between 10 and 20 mg, or between 20 and 30 mg.

Pharmaceutical compositions may be adapted for administration by any appropriate route, for example by an oral (including buccal or sublingual), rectal, nasal, topical (including buccal, sublingual or transdermal), vaginal, or parenteral (including subcutaneous, intramuscular, intravenous or intradermal) route. Such formulations may be prepared by any method known in the art of pharmacy, for example by bringing into association the active ingredient with the carrier(s) or excipient(s). By way of example, and not meant to limit the invention, with regard to certain conditions and disorders for which COMPOUND I may be useful, certain routes will be preferable to others.

Pharmaceutical compositions adapted for oral administration may be presented as discrete units such as capsules or tablets; powders or granules; solutions or suspensions, each with aqueous or non-aqueous liquids; edible foams or whips; or oil-in-water liquid emulsions or water-in-oil liquid emulsions. For instance, for oral administration in the form of a tablet or capsule, the active drug component can be combined with an oral, non-toxic pharmaceutically acceptable inert carrier such as ethanol, glycerol, water, and the like. Generally, powders are prepared by comminuting the compound to a suitable fine size and mixing with an appropriate pharmaceutical carrier such as an edible carbohydrate, as, for example, starch or mannitol. Flavorings, preservatives, dispersing agents, and coloring agents can also be present.

Capsules are made by preparing a powder, liquid, or suspension mixture and encapsulating with gelatin or some other appropriate shell material. Glidants and lubricants such as colloidal silica, talc, magnesium stearate, calcium stearate, or solid polyethylene glycol can be added to the mixture before the encapsulation. A disintegrating or solubilizing agent such as agar-agar, calcium carbonate or sodium carbonate can also be added to improve the availability of the medicament when the capsule is ingested. Moreover, when desired or necessary, suitable binders, lubricants, disintegrating agents, and coloring agents can also be incorporated into the mixture. Examples of suitable binders include starch, gelatin, natural sugars such as glucose or beta-lactose, corn sweeteners, natural and synthetic gums such as acacia, tragacanthin, or sodium alginate, carboxymethylcellulose, polyethylene glycol, waxes, and the like.

Lubricants useful in these dosage forms include, for example, sodium oleate, sodium stearate, magnesium stearate, sodium benzoate, sodium acetate, sodium chloride, and the like. Disintegrators include, without limitation, starch, methyl cellulose, agar, bentonite, xanthan gum, and the like.

Tablets are formulated, for example, by preparing a powder mixture, granulating or slugging, adding a lubricant and disintegrant, and pressing into tablets. A powder mixture may be prepared by mixing the compound, suitably comminuted, with a diluent or base as described above. Optional ingredients include binders such as carboxymethylcellulose, aliginates, gelatins, or polyvinyl pyrrolidone, solution retardants such as paraffin, resorption accelerators such as a quaternary salt, and/or absorption agents such as bentonite, kaolin, or dicalcium phosphate. The powder mixture can be wet granulated with a binder such as syrup, starch paste, acadia mucilage or solutions of cellulosic or polymeric materials, and forcing through a screen. As an alternative to granulating, the powder mixture can be run through the tablet machine and the result is imperfectly formed slugs broken into granules. The granules can be lubricated to prevent sticking to the tablet-forming dies by means of the addition of stearic acid, a stearate salt, talc or mineral oil. The lubricated mixture is then compressed into tablets. COMPOUND I can also be combined with a free-flowing inert carrier and compressed into tablets directly without going through the granulating or slugging steps. A clear or opaque protective coating consisting of a sealing coat of shellac, a coating of sugar or polymeric material, and a polish coating of wax can be provided. Dyestuffs can be added to these coatings to distinguish different unit dosages.

Where appropriate, dosage unit formulations for oral administration can be microencapsulated. The formulation can also be prepared to prolong or sustain the release as for example by coating or embedding particulate material in polymers, wax or the like.

Oral fluids such as solutions, syrups, and elixirs can be prepared in dosage unit form so that a given quantity contains a predetermined amount of the compound. Syrups can be prepared, for example, by dissolving the compound in a suitably flavored aqueous solution, while elixirs are prepared through the use of a non-toxic alcoholic vehicle. Suspensions can be formulated generally by dispersing the compound in a nontoxic vehicle. Solubilizers and emulsifiers such as ethoxylated isostearyl alcohols and polyoxy ethylene sorbitol ethers, preservatives; flavor additives such as peppermint oil, or natural sweeteners, saccharin, or other artificial sweeteners; and the like can also be added.

Pharmaceutical compositions adapted for topical administration may be formulated as ointments, creams, suspensions, lotions, powders, solutions, pastes, gels, sprays, aerosols, or oils.

For treatments of the eye or other external tissues, for example mouth and skin, the formulations may be applied as a topical ointment or cream. When formulated in an ointment, the active ingredient may be employed with either a paraffinic or a water-miscible ointment base. Alternatively, the active ingredient may be formulated in a cream with an oil-in-water cream base or a water-in-oil base. Pharmaceutical compositions adapted for topical administrations to the eye include eye drops wherein the active ingredient is suspended in a suitable carrier, especially an aqueous solvent.

Pharmaceutical compositions adapted for topical administration in the mouth include lozenges, pastilles, and mouthwashes.

Pharmaceutical compositions adapted for nasal administration, where the carrier is a solid, include a coarse powder. The powder is administered in the manner in which snuff is taken, i.e., by rapid inhalation through the nasal passage from a container of the powder held close up to the nose. Suitable formulations wherein the carrier is a liquid, for administration as a nasal spray or as nasal drops, include aqueous or oil solutions of the active ingredient.

Pharmaceutical compositions adapted for administration by inhalation include fine particle dusts or mists, which may be generated by means of various types of metered dose pressurized aerosols, nebulizers, or insufflators.

In another aspect, the presentation invention provides a method of manufacturing a pharmaceutical composition comprising a crystalline form of COMPOUND I as described in any one of embodiments E1 to E22.

Methods of Treatment

In another aspect, the present invention provides a method of treatment comprising administering a crystalline form of COMPOUND I to a subject in need thereof, or administering a pharmaceutical composition comprising a crystalline form of COMPOUND I and a pharmaceutically acceptable carrier. In an embodiment, the method comprises administering a therapeutically effective amount of COMPOUND I. In another embodiment, the method of treatment comprises administering a crystalline form of COMPOUND I as described in any one of embodiments E1 to E22 to a subject in need thereof, or administering a pharmaceutical composition comprising a crystalline form of COMPOUND I as described in any one of embodiments E1 to E22 and a pharmaceutically acceptable carrier to a subject in need thereof.

A pharmaceutical composition of the present invention may be administered at a dosage level of less than 1 g of COMPOUND I per dose or per day. In another embodiment, the dosage level of administration is greater than 1 mg of COMPOUND I per dose or per day. The amount of active ingredient that may be combined with the carrier materials to produce a single dosage will vary depending upon the host treated and the particular mode of administration. For example, in one non-limiting embodiment, a dosage unit forms, such as a tablet or capsule, intended for oral administration to humans may contain less than 100 mg of COMPOUND I with an appropriate and convenient amount of carrier material. In another embodiment, the dosage level of administration is greater than 1 mg of COMPOUND I thereof per day. In an embodiment, the dosage of COMPOUND I administered is between 1 and 100 mg, or between 1 and 50 mg, or between 10 and 50 mg, or between 30 and 50 mg. In other embodiments, the dosage of COMPOUND I administered is between 1 and 20 mg, or between 5 and 15 mg, or between 10 and 20 mg, or between 20 and 30 mg.

The dosage and/or the frequency of administration per day (once a day, twice a day, etc.) or per period (once a week, twice a week, etc.) may be individualized by the clinician based on the specific clinical condition of the subject being treated. Thus, it will be understood that the specific dosage level and frequency of administration for any particular subject may depend upon a variety of factors such as, but not limited to, the age, body weight, general health, sex, diet, time of administration, route of administration, rate of excretion, drug combination and the severity of the particular disease undergoing therapy.

Another embodiment of the present invention includes a method of inhibiting the activity of TNF-α in a subject in need thereof through the administration of COMPOUND I.

Another embodiment of the present invention includes a method of inhibiting PDE4 in a subject in need thereof through the administration of COMPOUND I.

Another embodiment of the present invention includes a method for the treatment of conditions or disorders mediated by activity of TNF-α through the administration of COMPOUND I.

Another embodiment of the present invention includes a method for the treatment of conditions or disorders mediated by PDE4 through the administration of COMPOUND I.

Another embodiment of the present invention includes a method for the treatment of an inflammatory disease through the administration of COMPOUND I. Inflammatory diseases may include, as non-limiting examples, viral, alcoholic, or drug-induced acute and fulminant hepatitis, hepatic steatosis, both alcoholic and non-alcoholic, viral and non-viral hepatitis, hepatic cirrhosis, autoimmune hepatitis, chronic active hepatitis, Wilson's disease, myasthenia gravis, idiopathic sprue, autoimmune inflammatory bowel disease, ulcerative colitis, Crohn's disease, inflammatory bowel diseases, endocrine ophthalmopathy, Grave's disease, sarcoidosis, primary biliary cirrhosis, pancreatitis, nephritis, endotoxin shock, septic shock, hemodynamic shock, sepsis syndrome, post ischemic reperfusion injury, malaria, mycobacterial infection, meningitis, psoriasis, asthma, chronic obstructive pulmonary disease (COPD), eosinophilia, congestive heart failure, fibrotic diseases, cystic fibrosis, pulmonary fibrosis, hepatic fibrosis, renal fibrosis, cachexia, graft rejection, graft vs. host disease, rejection by transplantation, cancer, diseases involving angiogenesis, autoimmune diseases, ankylosing spondylitis, autoimmune encephalomyelitis, autoimmune hematological disorders, hemolytic anemia, aplastic anemia, pure red cell anemia, idiopathic thrombocytopenia, systemic lupus erythematosus (SLE), polychondritis, scleroderma, Wegener granulomatosis, dermatomyositis, Reiter's syndrome, non-infection uveitis, autoimmune keratitis, keratoconjunctivitis sicca, vernal keratoconjunctivitis, interstitial lung fibrosis, psoriatic arthritis, psoriasis and other benign or malignant proliferative skin diseases, atopic dermatitis, urticaria, neurodegenerative disorders, Parkinson's disease, Alzheimer's disease, acute and chronic multiple sclerosis, cancer, viral infection such as SARS, MERS, COVID-19, or human immunodeficiency virus (HIV), cachexia, thrombosis, skin inflammatory diseases, osteoarthritis (OA), osteoporosis, RA, emphysema, chronic bronchiolitis, allergic rhinitis, radiation damage, hyperoxic alveolar injury, periodontal disease, non-insulin dependent diabetes mellitus (Type II diabetes), and insulin dependent diabetes mellitus (Juvenile or Type I diabetes).

In another embodiment, such treatment relates to conditions mediated by the inhibition of PDE4. Such conditions include a variety of conditions, especially inflammatory and/or allergic diseases, in mammals such as humans, for example: asthma, chronic obstructive pulmonary disease (COPD) (e.g. chronic bronchitis and/or emphysema), atopic dermatitis, urticaria, allergic rhinitis, allergic conjunctivitis, vernal conjunctivitis, eosinophilic granuloma, psoriasis, rheumatoid arthritis, septic shock, ulcerative colitis, Crohn's disease, reperfusion injury of the myocardium and brain, chronic glomerulonephritis, endotoxic shock, adult respiratory distress syndrome, multiple sclerosis, cognitive impairment (e.g. in a neurological disorder such as Alzheimer's disease), depression, or pain. Ulcerative colitis and/or Crohn's disease are collectively often referred to as inflammatory bowel disease.

In an embodiment of the present invention, the inflammatory and/or allergic disease is chronic obstructive pulmonary disease (COPD), asthma, psoriasis, or rheumatoid arthritis in a mammal (e.g. human). In another embodiment, the present invention provides a method of treating a disease selected from the group consisting of COPD, atopic dermatitis, psoriasis, IBD and Crohn's disease.

Another embodiment of the present invention includes a method for the treatment of a disease or condition by administering to a subject in need thereof COMPOUND I or a pharmaceutical composition comprising COMPOUND I to a subject in need thereof, wherein the disease or condition is selected from the group consisting of: hepatitis, non-alcoholic steatohepatitis, alcoholic steatohepatitis, hepatic cirrhosis, Wilson's disease, myasthenia gravis, idiopathic sprue, inflammatory bowel disease, endocrine ophthalmopathy, Grave's disease, sarcoidosis, pancreatitis, nephritis, endotoxin shock, septic shock, hemodynamic shock, sepsis syndrome, post ischemic reperfusion injury, malaria, mycobacterial infection, meningitis, psoriasis, asthma, chronic obstructive pulmonary disease, eosinophilia, congestive heart failure, fibrotic disease, cachexia, graft rejection, graft vs. host disease, rejection by transplantation, ankylosing spondylitis, autoimmune encephalomyelitis, hemolytic anemia, aplastic anemia, pure red cell anemia, idiopathic thrombocytopenia, systemic lupus erythematosus, polychondritis, scleroderma, Wegener granulomatosis, dermatomyositis, Reiter's syndrome, non-infection uveitis, autoimmune keratitis, keratoconjunctivitis sicca, vernal keratoconjunctivitis, psoriatic arthritis, atopic dermatitis, urticaria, viral infection, thrombosis, osteoarthritis, osteoporosis, emphysema, chronic bronchiolitis, allergic rhinitis, radiation damage, hyperoxic alveolar injury, periodontal disease, non-insulin dependent diabetes mellitus, and insulin dependent diabetes mellitus. In a further embodiment, the disease or condition is hepatitis, wherein the hepatitis is alcoholic hepatitis, non-alcoholic hepatitis, viral hepatitis, drug induced hepatitis, or autoimmune hepatitis. In another further embodiment, the disease or condition is inflammatory bowel disease, wherein the inflammatory bowel disease is ulcerative colitis, Crohn's disease, or an autoimmune inflammatory bowel disease. In another further embodiment, the disease or condition is a fibrotic disease, wherein the fibrotic disease is cystic fibrosis, pulmonary fibrosis, hepatic fibrosis, renal fibrosis, or interstitial lung fibrosis. In another further embodiment, the disease or condition is a viral infection, wherein the viral infection is severe acute respiratory syndrome coronavirus 1, severe acute respiratory syndrome coronavirus 2, Middle East respiratory syndrome-related coronavirus, or human immunodeficiency virus.

Another embodiment of the present invention includes a method for the treatment of a disease or condition by administering COMPOUND I or a pharmaceutical composition comprising COMPOUND I and a pharmaceutical carrier to a subject in need thereof, wherein the disease or condition is selected from the group consisting of: asthma, chronic obstructive pulmonary disease, atopic dermatitis, urticaria, allergic rhinitis, allergic conjunctivitis, vernal conjunctivitis, eosinophilic granuloma, psoriasis, rheumatoid arthritis, septic shock, ulcerative colitis, Crohn's disease, reperfusion injury of the myocardium and brain, chronic glomerulonephritis, endotoxic shock, adult respiratory distress syndrome, a neurological disorder, depression, or pain. In a further embodiment, the disease or condition is chronic obstructive pulmonary disease, asthma, psoriasis, or rheumatoid arthritis. In another further embodiment, the disease or condition is chronic obstructive pulmonary disease, where the chronic obstructive pulmonary disease is chronic bronchitis or emphysema. In another further embodiment, the disease or condition is chronic obstructive pulmonary disease, atopic dermatitis, or psoriasis. In another further embodiment, the disease or condition is neurological disorder, wherein the neurological disorder is Parkinson's disease, Alzheimer's disease, or multiple sclerosis.

The COMPOUND I may also be administered in combination with other conventional anti-inflammatory or immunosuppressive agents, such as steroids, cyclooxygenase inhibitors, non-steroidal-anti-inflammatory drugs, TNF-α antibodies or other TNF-binding proteins, such as for example acetyl salicylic acid, bufexamac, diclofenac potassium, sulindac, diclofenac sodium, ketorolac trometamol, tolmetin, ibuprofen, naproxen, naproxen sodium, tiaprofenic acid, flurbiprofen, mefenamic acid, nifluminic acid, meclofenamate, indomethacin, proglumetacine, ketoprofen, nabumetone, paracetamol, piroxicam, tenoxicam, nimesulide, fenylbutazon, tramadol, beclomethasone dipropionate, betamethasone, beclamethasone, budesonide, fluticasone, mometasone, dexamethasone, hydrocortisone, methylprednisolone, prednisolone, prednisone, triamcinolone, celecoxib, rofecoxib, infliximab, leflunomide, etanercept, methotrexate, sulfasalazine, antilymphocyte immunoglobulins, antithymocyte immunoglobulins, azathioprine, cyclosporine, tacrolimus substances, ascomycin, rapamycin, adalimumab, muromonab-CD3 or other antibodies or fusion proteins that modulate T-cell function such as abatacept, alefacept and efalizumab.

As noted above, COMPOUND I may be employed alone or in combination with other therapeutic agents. Such a combination of pharmaceutically active agents may be administered together or separately and, when administered separately, administration may occur simultaneously or sequentially, in any order. The amounts of the compounds or agents and the relative timings of administration will be selected in order to achieve the desired therapeutic effect. The administration with other treatment agents may be in combination by administration concomitantly in: (1) a unitary pharmaceutical composition including both compounds; or (2) separate pharmaceutical compositions each including one of the compounds. Alternatively, the combination may be administered separately in a sequential manner wherein one treatment agent is administered first and the other second or vice versa. Such sequential administration may be close in time or remote in time. COMPOUND I may be used in the treatment of a variety of disorders and conditions and, as such, may be used in combination with a variety of other suitable therapeutic agents useful in the treatment or prophylaxis of those disorders or conditions.

EXAMPLES

Example 1. X-ray Powder Diffraction Peaks for Crystalline Form I

The XRPD pattern was collected with a PANalytical X'Pert PRO MPD diffractometer using an incident beam of Cu radiation produced using an Optix long, fine-focus source. An elliptically graded multilayer mirror was used to focus Cu Kα X-rays through the specimen and onto the detector. Prior to the analysis, a silicon specimen (NIST SRM 640e) was analyzed to verify the observed position of the Si 111 peak is consistent with the NIST-certified position. A specimen of the sample was sandwiched between 3-μm-thick films and analyzed in transmission geometry. A beam-stop, short antiscatter extension, and an antiscatter knife edge were used to minimize the background generated by air. Soller slits for the incident and diffracted beams were used to minimize broadening from axial divergence. Diffraction patterns were collected using a scanning position-sensitive detector (X'Celerator) located 240 mm from the specimen and Data Collector software v. 5.5.

Crystalline Form I is characterized substantially by the XRPD profile as shown in FIG. 1 and the following XRPD data (Table 1).

TABLE 1

| Angle (Degree 2Θ) | d space (Å) | Relative Intensity* % |
|---|---|---|
| 9.1 ± 0.2 | 9.76 ± 0.22 | 90 |
| 11.6 ± 0.2 | 7.60 ± 0.13 | 59 |
| 12.0 ± 0.2 | 7.39 ± 0.12 | 55 |
| 14.2 ± 0.2 | 6.23 ± 0.09 | 37 |
| 16.5 ± 0.2 | 5.37 ± 0.07 | 50 |
| 19.0 ± 0.2 | 4.67 ± 0.05 | 39 |
| 21.7 ± 0.2 | 4.09 ± 0.04 | 32 |
| 22.4 ± 0.2 | 3.97 ± 0.04 | 51 |
| 24.1 ± 0.2 | 3.69 ± 0.03 | 100 |

*The relative intensities can change depending on the crystal size and morphology.

Representative values of degree 2θ for Form I are 11.6, 12.0, and 24.1.

Example 2. XRPD Indexing of Form I

The high-resolution XRPD pattern was indexed using SSCI software (Triads™). Indexing and structure refinement are computational studies. Agreement between the allowed peak positions and the observed peaks indicates a consistent unit cell determination. Successful indexing of the pattern indicates that the sample is composed primarily of a single crystalline phase. Space groups consistent with the assigned extinction symbol, unit cell parameters, and derived quantities are tabulated below showing a tentative indexing solution. To confirm the tentative indexing solution, the molecular packing motifs within the crystallographic unit cells must be determined. No attempts at molecular packing were performed.

The unit cell parameters for Form I are as follows:

| Bravais Type | Primitive Monoclinic |
|---|---|
| a [Å] | 11.950 |
| b [Å] | 11.288 |
| c [Å] | 18.340 |
| α [deg] | 90 |
| β [deg] | 93.11 |
| γ [deg] | 90 |
| Volume [Å³/cell] | 2,470.3 |
| Chiral Contents? | Not Specified |
| Extinction Symbol | P 1 2$_1$/n 1 |
| Space Group(s) | P2$_1$/n (14) |

Example 3. Solid-State $^{13}$C NMR Shifts for Form I

The $^{13}$C solid-state cross polarization magic angle spinning (CP/MAS) NMR spectrum was acquired at ambient temperature on an Agilent DD2-400 spectrometer (Larmor frequencies: $^{13}$C=100.549 MHz, $^{1}$H=399.812 MHz). The sample was packed into a 4 mm PENCIL type zirconia rotor and rotated at 12 kHz at the magic angle. The spectrum was acquired with phase modulated (SPINAL-64) high power $^{1}$H decoupling during the acquisition time using a $^{1}$H pulse width of 2.6 μs (90°), a ramped amplitude cross polarization contact time of 5 ms, a 30 ms acquisition time, a 10 second delay between scans, a spectral width of 45 kHz with 2678 data points, and 1600 co-added scans. The free induction decay (FID) was processed using Agilent VnmrJ 3.2A software with 65536 points and an exponential line broadening factor of 10 Hz to improve the signal-to-noise ratio. The first three data points of the FID were back predicted using the VNMR linear prediction algorithm to produce a flat baseline. The chemical shifts of the spectral peaks were externally referenced to the carbonyl carbon resonance of glycine at 176.5 ppm.

Crystalline Form I is characterized substantially by the solid-state $^{13}$C NMR spectrum as shown in FIG. 4 and by the following solid-state $^{13}$C NMR shifts.

| Form I $^{13}$C Chemical Shifts[a] [ppm] | Intensity[b] |
|---|---|
| 177.4 | 57.4 |
| 161.9 | 68.3 |
| 150.8 | 58.8 |
| 149.4 | 94.3 |
| 144.7 | 28.3 |
| 139.3 | 62.1 |
| 135.2 | 36.7 |
| 132.1 | 65.1 |
| 130.7 | 135.3 |
| 127.6 | 36.9 |
| 118.0 | 61.6 |
| 117.4 | 88.4 |
| 108.6 | 57.3 |
| 56.6 | 100.1 |
| 43.1 | 73.8 |

| Form I $^{13}$C Chemical Shifts$^a$ [ppm] | Intensity$^b$ |
|---|---|
| 32.4 | 47.2 |
| 29.6 | 86.9 |
| 26.9 | 50.9 |

$^a$Referenced to the carbonyl carbon resonance of an external sample of glycine at 176.5 ppm.
$^b$Defined as peak heights. Intensities can vary depending on the actual setup of the experimental parameters and the thermal history of the sample. Intensities are not necessarily quantitative.

Individual representative solid-state $^{13}$C NMR peaks for Form I are as follows:

| Form I $^{13}$C Chemical Shifts$^a$ [ppm] | Intensity$^b$ |
|---|---|
| 177.4 | 57.4 |
| 161.9 | 68.3 |
| 149.4 | 94.3 |
| 139.3 | 62.1 |
| 130.7 | 135.3 |
| 118.0 | 61.6 |
| 117.4 | 88.4 |
| 108.6 | 57.3 |

Example 4. FT-IR Peaks for Form I

The IR spectrum was acquired using a Nicolet 6700 Fourier transform infrared (FT-IR) spectrophotometer (Thermo Nicolet) equipped with an Ever-Glo mid/far IR source, a potassium bromide (KBr) beamsplitter, and a deuterated triglycine sulfate (DTGS) detector. Wavelength verification was performed using NIST SRM 1921b (polystyrene). An attenuated total reflectance (ATR) accessory (Thunderdome™, Thermo Spectra-Tech) equipped with a germanium (Ge) crystal was used for data acquisition. The spectrum represents 256 co-added scans collected at a spectral resolution of 4 cm-1. A background data set was acquired with a clean Ge crystal. A Log 1/R (R=reflectance) spectrum was obtained by taking a ratio of these two data sets against each other.

Crystalline Form I is characterized substantially by the FT-IR spectrum as shown in FIG. 5 and by the following FT-IR peaks.

| FT-IR Peak List of Form I Wavenumbers (cm$^{-1}$) |
|---|
| 695 |
| 733 |
| 745 |
| 753 |
| 768 |
| 794 |
| 811 |
| 821 |
| 859 |
| 884 |
| 910 |
| 984 |
| 1003 |
| 1025 |
| 1037 |
| 1052 |
| 1071 |
| 1085 |
| 1097 |
| 1107 |
| 1122 |
| 1146 |
| 1192 |
| 1212 |
| 1225 |
| 1244 |
| 1262 |
| 1284 |
| 1311 |
| 1331 |
| 1359 |
| 1374 |
| 1387 |
| 1400 |
| 1413 |
| 1447 |
| 1469 |
| 1481 |
| 1555 |
| 1578 |
| 1626 |
| 1679 |
| 1731 |
| 1979 |
| 2004 |
| 2609 |
| 2846 |
| 2868 |
| 2884 |
| 2952 |
| 2979 |
| 3014 |
| 3043 |
| 3072 |
| 3149 |
| 3411 |

Individual representative FT-IR peaks for Form I are as follows:

| Form I Wavenumbers (cm$^{-1}$) |
|---|
| 768 |
| 1447 |
| 1626 |
| 1679 |
| 1731 |
| 1742 |

Example 5. Differential Scanning Calorimetry Analysis of Form I

DSC of Form I (rate 10° C./min, initial temp. −10° C. to final temp 400° C.) showed a first endotherm with an onset at about 231° C., peak at about 263° C., and endset at about 267° C. and a second endotherm with an onset at about 354° C., peak at about 360° C., and endset at about 362° C. (FIG. 2).

Example 6. Thermogravimetric Analysis of Form I

Thermogravimetric analysis (TGA) of Form I (sample weight of 14.19 mg; initial temp 25° C. and final temp. 350° C., at rate of 10.00° K/min) showed: a weight loss of about 0.8% wt/wt from about 25° C. to about 127° C.; a weight loss of about 6.9% wt/wt from about 130° C. to about 300° C.; a weight loss of about 1.7% wt/wt from about 300° C. to about 350° C.; and a total weight loss of about 9.5% from about 25° C. to about 350° C. (FIG. 3).

Example 7. Method of Producing Form I of COMPOUND I

Synthesis of the Form I of COMPOUND I may be accomplished via a 3-step process. All reactions may be carried out under inert atmosphere such as nitrogen or argon with dry solvents.

Step 1: Ethyl-4-chloro-8-methoxyquinoline-3-carboxylate (1.0 eq) and trans-t-butyl-4-aminocyclohexanecarboxylate hydrochloride (1.2 eq) were reacted in presence of sodium bicarbonate (4.0 eq) and NMP (1-Methyl-2-pyrrolidinone). The Step 1 intermediate was precipitated from reaction mixture by addition of water. The resulting solids were collected by filtration and slurried in water to remove residual inorganics and water miscible organic solvents. The isolated, dried solids may be recrystallized in acetonitrile in high yield and purity.

Step 2: The Step 1 intermediate (1.0 eq) was treated with sodium hydride (3.0 eq) in presence of NMP followed by addition of 3-chlorophenylisocyanate (3.0 eq). Following reaction completion, the mixture was quenched with mixture of $NH_4Cl$-Water-Methanol and the Step 2 Intermediate precipitated. The crude product was collected by filtration and washed with methanol and water. The crude solids may be purified via sequential slurries with i) methanol, ii) methanol-tetrahydrofuran and iii) acetone-tetrahydrofuran.

Step 3: The Step 2 intermediate (1.0 eq) was suspended in a mixture of acetic acid followed by the addition of 6M HCl, and the resulting mixture agitated 20±5° C. Following completion of hydrolysis, the mixture was treated with water, and the resulting solids collected by filtration. The crude material of COMPOUND I may be slurried in 5 M HCl multiple times at 60° C., followed by cooling to room temperature, followed by filtering and washing with 5 M HCl to increase purity of crystals and/or remove residual acetic acid.

What is claimed is:

1. A crystalline form of trans-4-[1-(3-Chloro-phenyl)-7-methoxy-2,4-dioxo-3,4-dihydro-2H-pyrimido[5,4-c]quinolin-3-yl]-cyclohexanecarboxylic acid hydrochloride, wherein the crystalline form is characterized as having an X-ray powder diffraction (XRPD) pattern comprising peaks at 11.6°±0.2°, 12.0°±0.2°, and 24.1°±0.2° measured using Cu Ka X-rays; and optionally
   a first endothermic peak with an onset at about 231° C. and a second endothermic peak with an onset at about 354° C. or is characterized by a first endothermic peak with a peak at about 263° C. and a second endothermic peak with a peak at about 360° C. as determined by Differential Scanning calorimetry (DSC); or
   a weight loss of about 0.8% wt/wt from about 25° C. to about 127° C. a weight loss of about 6.9% wt/wt from about 130° C. to about 300° C., a weight loss of about 1.7% wt/wt from about 300° C. to about 350° C. and/or a weight loss of about 9.5% from about 25° C. to about 350° C. as determined by Thermogravimetry Analysis (TGA); or
   a solid-state $^{13}C$ Nuclear Magnetic Resonance (NMR) spectrum having peaks at 177.4, 161.9, 149.4, and 130.7 ppm, when the external reference of the carbonyl resonance of glycine is 176.5 ppm; or
   a Fourier transform infrared (FT-IR) spectrum with peaks at 1679 and 1731 cm$^{-1}$.

2. The crystalline form of claim 1, wherein the crystalline form is characterized as having an X-ray powder diffraction (XRPD) pattern comprising peaks at 11.6°±0.2°, 12.0°±0.2°, and 24.1°±0.2° measured using Cu Ka X-rays; and a first endothermic peak with an onset at about 231° C. and a second endothermic peak with an onset at about 354° C. or is characterized by a first endothermic peak with a peak at about 263° C. and a second endothermic peak with a peak at about 360° C. as determined by Differential Scanning calorimetry (DSC).

3. The crystalline form of claim 1, wherein the crystalline form is characterized as having an X-ray powder diffraction (XRPD) pattern comprising peaks at 11.6°±0.2°, 12.0°±0.2°, and 24.1°±0.2°, measured using Cu Ka X-rays; and a weight loss of about 0.8% wt/wt from about 25° C. to about 127° C. a weight loss of about 6.9% wt/wt from about 130° C. to about 300° C. a weight loss of about 1.7% wt/wt from about 300° C. to about 350° C., and/or a weight loss of about 9.5% from about 25° C. to about 350° C. as determined by Thermogravimetry Analysis (TGA).

4. The crystalline form of claim 1, wherein the crystalline form is characterized as having an X-ray powder diffraction (XRPD) pattern comprising peaks at 11.6°±0.2°, 12.0°±0.2°, and 24.1°±0.2° measured using Cu Ka X-rays; and a solid-state $^{13}C$ Nuclear Magnetic Resonance (NMR) spectrum having peaks at 177.4, 161.9, 149.4, and 130.7 ppm, when the external reference of the carbonyl resonance of glycine is 176.5 ppm; or a Fourier transform infrared (FT-IR) spectrum with peaks at 1679 and 1731 cm$^{-1}$.

5. A crystalline form of trans-4-[1-(3-Chloro-phenyl)-7-methoxy-2,4-dioxo-3,4-dihydro-2H-pyrimido[5,4-c]quinolin-3-yl]-cyclohexanecarboxylic acid hydrochloride, wherein the crystalline form is characterized as having an X-ray powder diffraction (XRPD) pattern substantially the same as shown in FIG. 1; and optionally
   a Differential Scanning calorimetry (DSC) profile substantially the same as shown in FIG. 2; or
   a Thermogravimetry Analysis (TGA) profile substantially the same as shown in FIG. 3; or
   a solid-state $^{13}C$ Nuclear Magnetic Resonance (NMR) spectrum substantially the same as shown in FIG. 4; or
   a Fourier transform infrared (FT-IR) spectrum substantially the same as shown in FIG. 5.

6. The crystalline form of claim 1, wherein the crystalline form is characterized as having an X-ray powder diffraction (XRPD) pattern substantially the same as shown in FIG. 1; and a Differential Scanning calorimetry (DSC) profile substantially the same as shown in FIG. 2.

7. The crystalline form of claim 1, wherein the crystalline form is characterized as having an X-ray powder diffraction (XRPD) pattern substantially the same as shown in FIG. 1; and a Thermogravimetry Analysis (TGA) profile substantially the same as shown in FIG. 3.

8. The crystalline form of claim 1, wherein the crystalline form is characterized as having an X-ray powder diffraction (XRPD) pattern substantially the same as shown in FIG. 1; and a solid-state $^{13}C$ Nuclear Magnetic Resonance (NMR) spectrum substantially the same as shown in FIG. 4; or a Fourier transform infrared (FT-IR) spectrum substantially the same as shown in FIG. 5.

9. A crystalline form of trans-4-[1-(3-Chloro-phenyl)-7-methoxy-2,4-dioxo-3,4-dihydro-2H-pyrimido[5,4-c]quinolin-3-yl]-cyclohexanecarboxylic acid hydrochloride, wherein the crystalline form is characterized as having an X-ray powder diffraction (XRPD) pattern substantially the same as shown in FIG. 1; and a Differential Scanning calorimetry (DSC) profile substantially the same as shown in FIG. 2; or a Thermogravimetry Analysis (TGA) profile substantially the same as shown in FIG. 3; or a solid-state $^{13}$C Nuclear Magnetic Resonance (NMR) spectrum substantially the same as shown in FIG. 4; or a Fourier transform infrared (FT-IR) spectrum substantially the same as shown in FIG. 5.

10. The crystalline form of claim 1, wherein the crystalline form has a polymorphic purity of at least about 80%, or at least about 90%, or at least about 95%, or at least about 99%.

11. A pharmaceutical composition comprising the crystalline form of claim 1 and a pharmaceutically acceptable carrier.

12. A method for producing the crystalline form of claim 1, the method comprising: a) mixing trans-4-[1-(3-Chlorophenyl)-7-methoxy-2,4-dioxo-3,4-dihydro-2H-pyrimido[5,4-c]quinolin-3-yl]-cyclohexanecarboxylic or salt thereof in an aqueous solution comprising hydrochloric acid, where the aqueous solution has a temperature of at least 30° C.; and b) cooling the mixture to below 30° C.

13. The method of claim 12, wherein the aqueous solution comprising hydrochloric acid is 5 M HCl.

14. The method of claim 12, where the aqueous solution in step a) has a temperature of at least 50° C.

\* \* \* \* \*